Jan. 14, 1930.  A. C. HEINZEN  1,743,969
SNOWPLOW
Filed April 25, 1927  5 Sheets-Sheet 5
Fig. 6
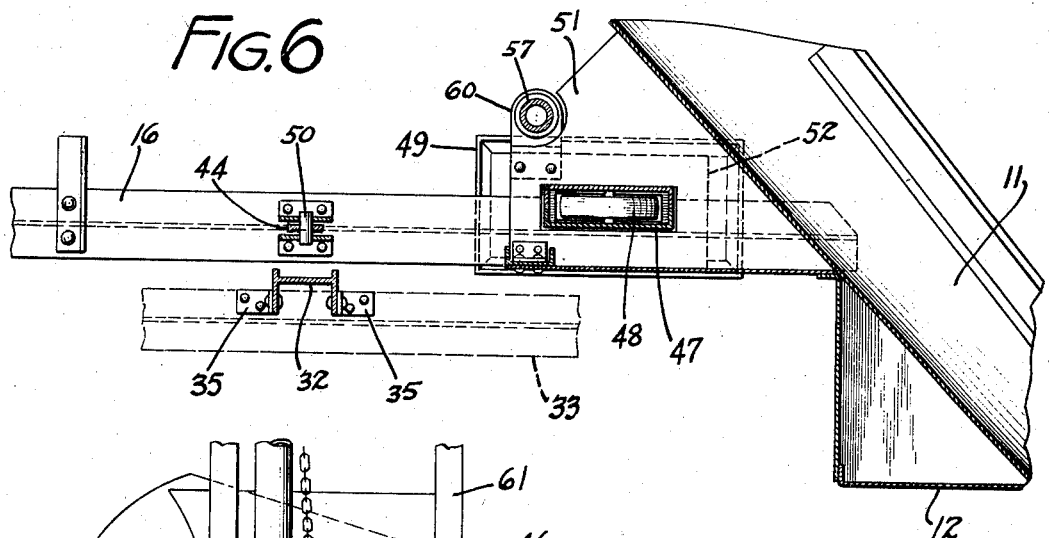
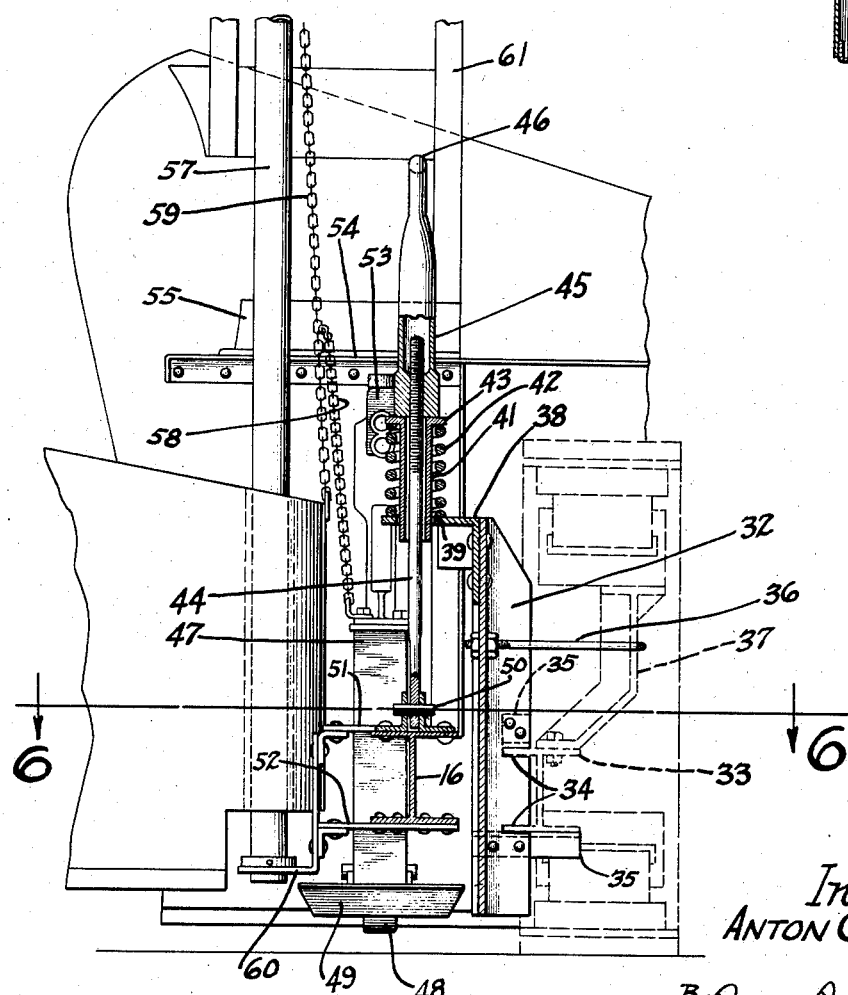
Fig. 5
Inventor
ANTON C. HEINZEN
ATTORNEYS Patented Jan. 14, 1930

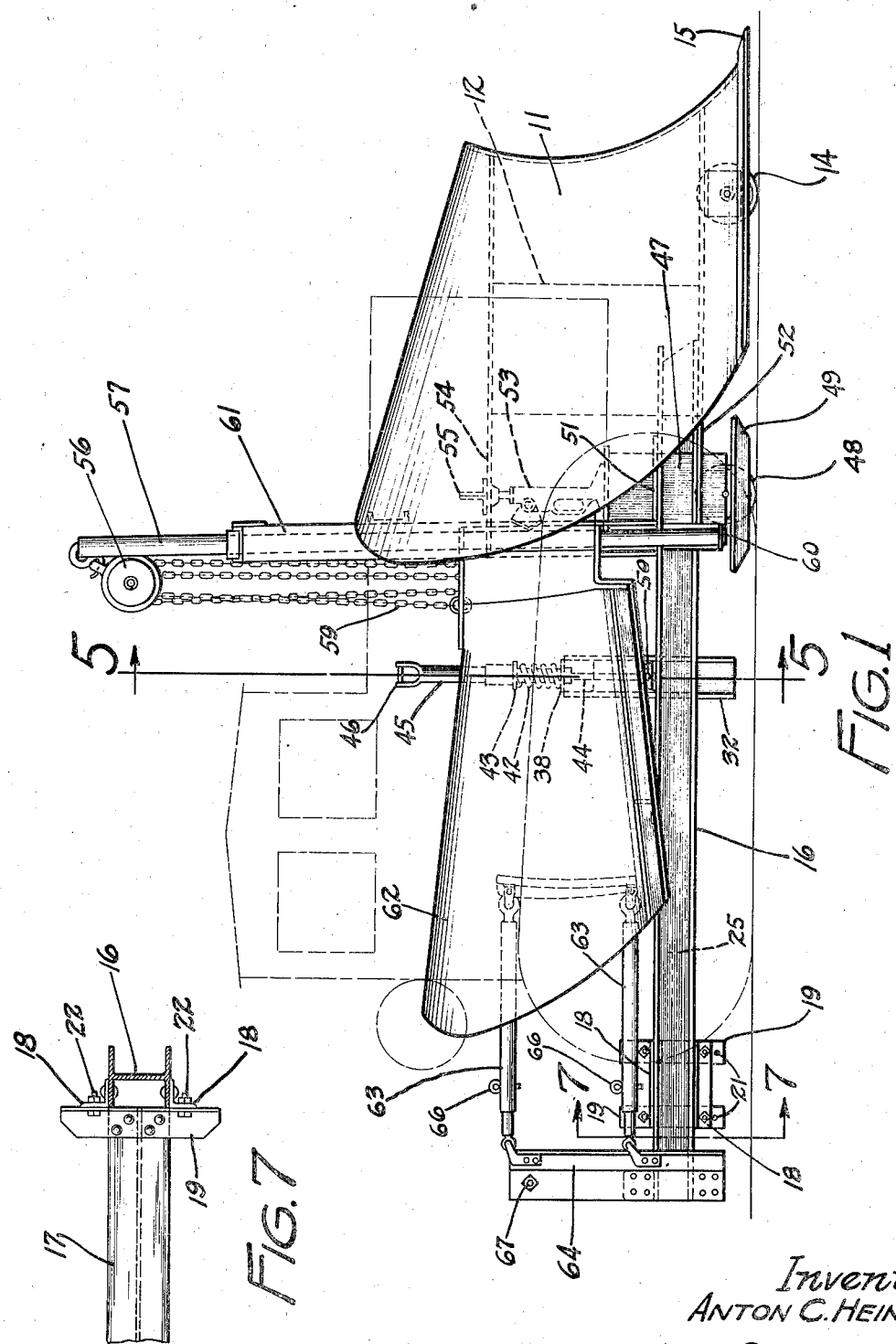

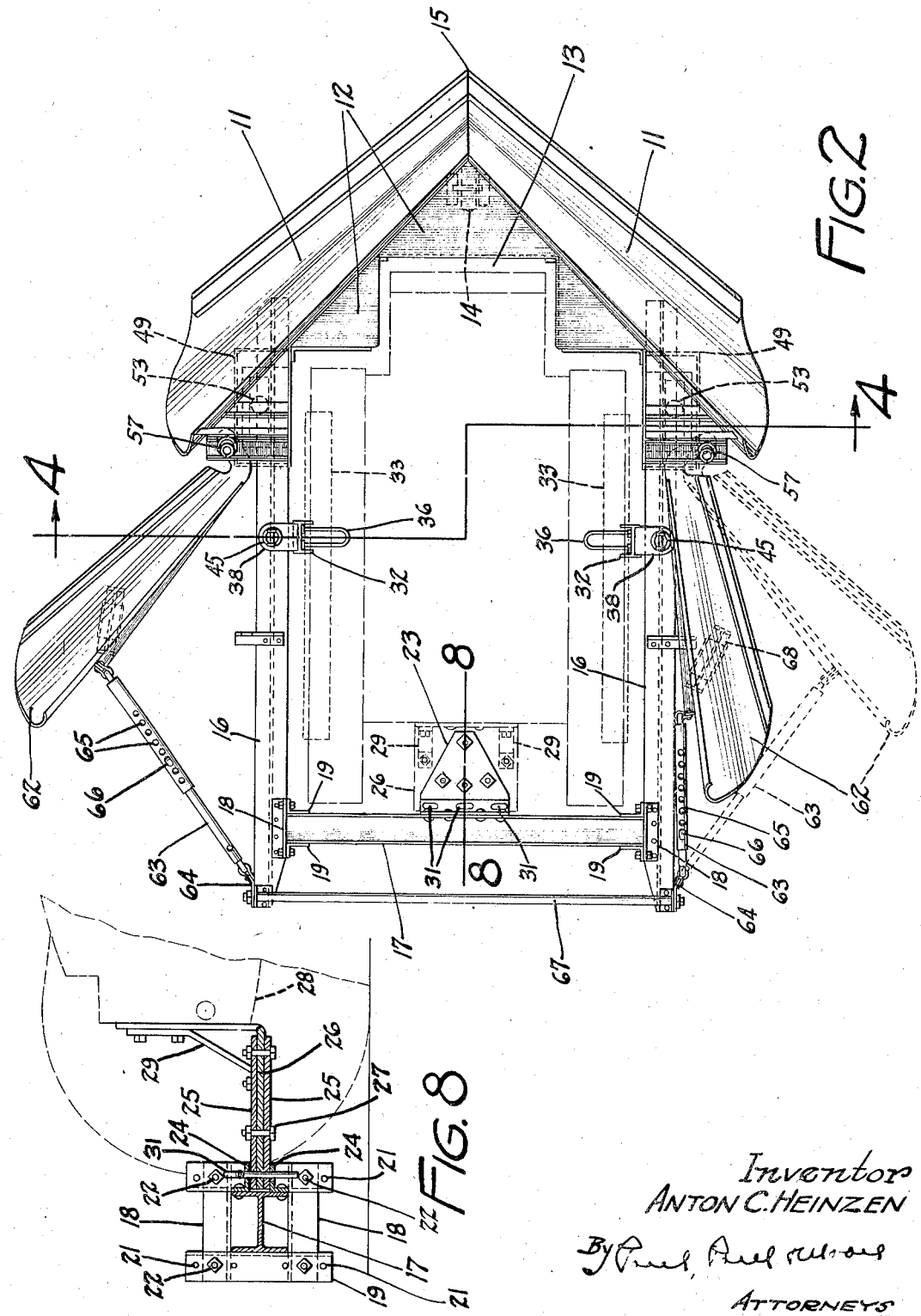

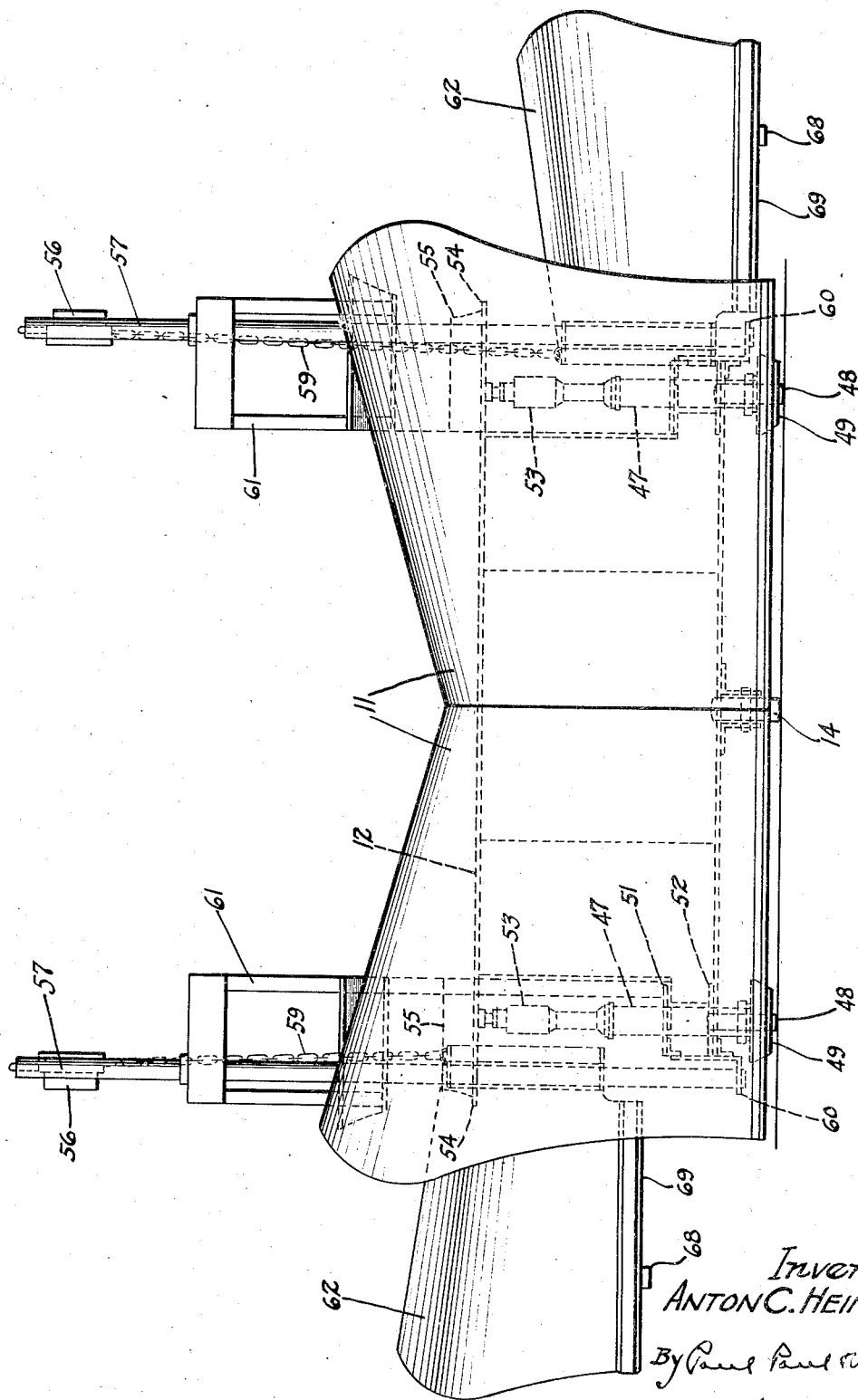

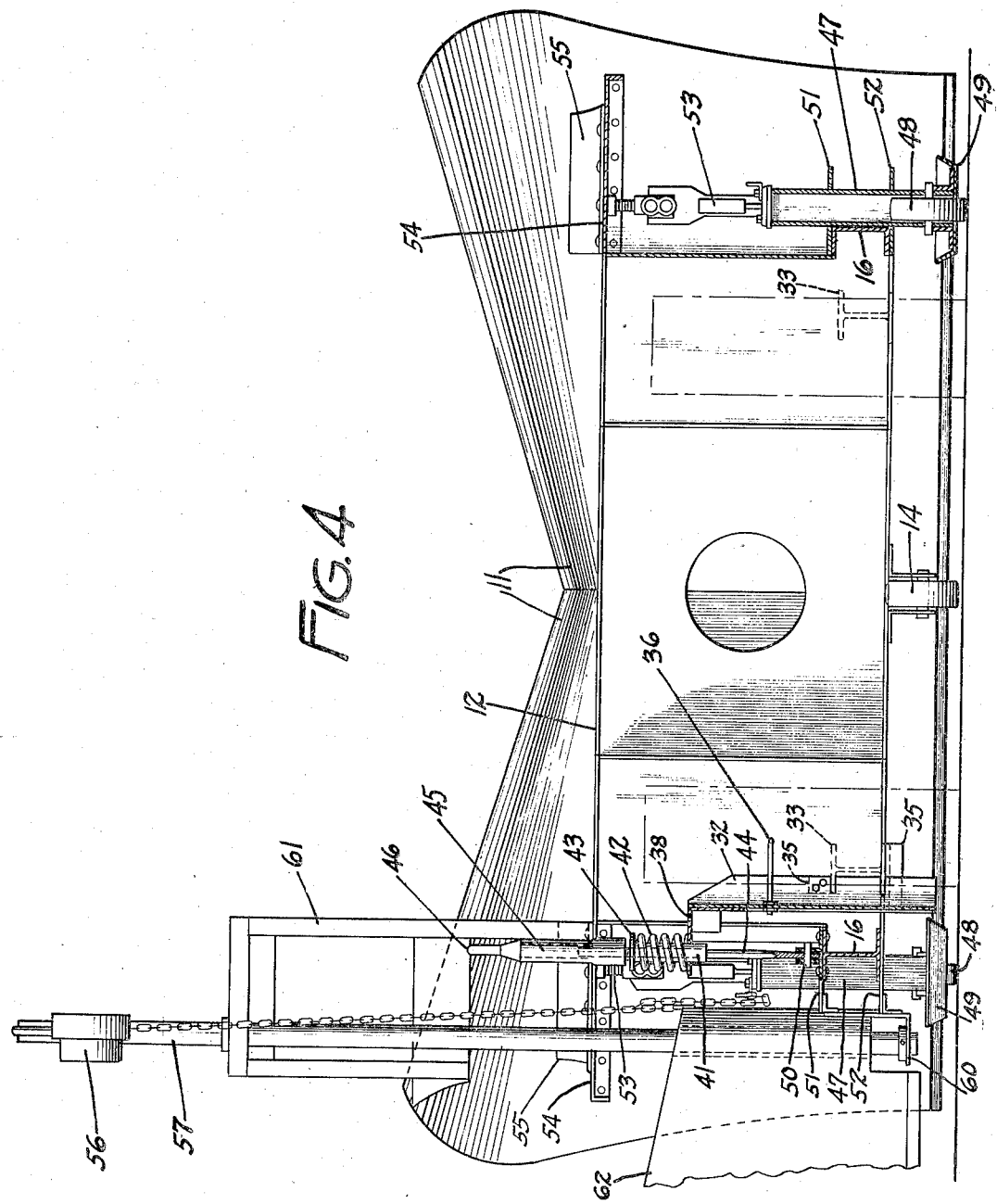

1,743,969

UNITED STATES PATENT OFFICE

ANTON CHARLES HEINZEN, OF WAUSAU, WISCONSIN, ASSIGNOR TO WAUSAU IRON WORKS, OF WAUSAU, WISCONSIN, A CORPORATION OF WISCONSIN

SNOWPLOW

Application filed April 25, 1927. Serial No. 186,520.

This invention relates to new and useful improvements in snow plows of the type adapted for use in connection with tractors, and an object of the invention is to provide such a plow having a frame adapted to substantially encircle the tractor, and having means at the rear portion thereof for connecting the tractor thereto, so that while the plow is positioned ahead of the tractor, the draft connection between plow and tractor will be at the rear of the tractor and not at the forward end thereof, as is common practice with various types of snow plows.

A further object of the invention is to provide a snow plow comprising a rectangular frame arranged to encircle the tractor and having a cross member or draft bar at the rear end thereof, having means for loosely connecting the tractor thereto, and the plow frame also having means adapted to engage the tractor frame to prevent the tractor from rubbing against the plow frame when turning corners.

A further object is to provide a snow plow including a frame, having its rear end portion adapted to be connected to a tractor and having means adjacent the forward end thereof for resiliently supporting the forward end of the plow frame upon the tractor, whereby the position of the plow with respect to the ground level may be adjusted or varied as desired.

A further object is to provide a plow of the class described, comprising a rectangular frame to the forward end of which the plow is attached, and vertically movable ground-engaging shoes or supports being provided adjacent the forward end of the plow frame adapted to be moved into engagement with the road surface to carry the weight of the plow and its supporting frame, and a lifting jack being provided upon each of said supports, adapted to engage the plow frame and bodily lift or vertically move the plow and its frame with respect to the supports, the latter also providing means for supporting the plow while in use, so that the entire weight of the plow and its frame may be carried on said supports and shoes, thereby preventing the plow from lifting or raising when bucking hard snow.

A further object is to provide a snow plow having a frame provided with means adjacent the forward end thereof for yieldably connecting it to a tractor frame to provide a resilient support therefor, and said resilient support or mounting being adjustable, whereby the weight of the plow may be partially carried upon the tractor, or, if desired, the entire weight thereof may be carried upon the tractor, thereby providing means for adding additional weight to the tractor to insure good traction when bucking heavy snow drifts.

A further object is to provide such a snow plow, comprising pivotally mounted side wings adapted for vertical and lateral adjustment and functioning to increase the effective plowing width of the plow.

Other objects of the invention reside in the constructional details of the plow and its supporting means, including the means provided for resiliently supporting the forward end of the plow upon the tractor; the adjustable feature of the plow supports and shoes; the means means for loosely connecting the tractor to the plow frame; and, in the provision of adjustably mounted side wings, whereby the swath of the plow may be increased to cover a comparatively wide roadway.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the accompanying drawings forming part of this specification;

Figure 1 is a view in side elevation of the improved plow, showing the tractor in dot and dash lines;

Figure 2 is a plan view of Figure 1, showing in full and dotted lines, the positions of the side wings;

Figure 3 is a front view of the improved plow, showing one of the side wings lowered to substantially engage the ground surface, and showing the opposite wing in a more elevated position;

Figure 4 is a cross sectional view on the line 4—4 of Figure 2;

Figure 5 is an enlarged detailed sectional view on the line 5—5 of Figure 1, showing the means at the forward end of the plow frame for resiliently supporting the plow and frame upon the tractor;

Figure 6 is a detailed sectional plan view on the line 6—6 of Figure 5;

Figure 7 is an enlarged detailed sectional view on the line 7—7 of Figure 1, showing the adjustable connection of the draft bar with the side members of the plow frame; and Figure 8 is an enlarged detailed sectional view on the line 8—8 of Figure 2 showing the coupling between the tractor and plow frame.

The novel apparatus featured in the invention comprises a pair of mold boards 11 having their forward edges joined to a plow as shown. The mold boards 11 are secured to a bulk head 12 which is provided with a central offset 13 adapted to provide clearance for the forward end of the tractor frame, as indicated in dotted lines in Figure 2. A safety roller or wheel 14 is provided beneath the bulk head 12 to provide a support for the forward end or nose of the plow 11 as shown in Figures 1 and 4. The purpose of this roller is to prevent the nose 15 of the plow from digging into the road surface when traveling over rough ground.

A pair of I-beams 16 have their forward ends secured to the bulk head 12 and co-operate therewith to provide a substantial support for the mold boards 11, suitably secured thereto. A draft bar 17 is demountably and adjustably secured to the rear end portions of the side beams 16 by means of angle irons 18 riveted to the inner horizontal webs of the I-beams 16, and upper angle bars 19 securely riveted to the draft bar 17, as shown in Figure 7. Each angle bar 19 has a plurality of apertures 21 therein adapted to receive bolts 22, which function to secure the draft bar 17 to the side beam 16 of the plow frame. By thus connecting the draft bar to the rear end portions of the plow frame, the draft bar may be vertically adjusted with respect thereto so as to properly position it with respect to the hitch or coupling 23 of the tractor. This coupling is shown in detail in Figure 8, and comprises angle bars 24, rigidly riveted or bolted to the inner web of the draft bar 17 and having their horizontal webs spaced apart to receive the coupling plates 25 and 26. The coupling plate 26 is interposed between the plates 25, and is securely bolted therebetween by bolts 27. The inner end of the plate 26 is bent upwardly as shown, and is secured to the rear end portion 28 of the tractor, partially shown in Figure 8. A brace plate or bar 29 is provided to retain the draft plate in right-angled relation with respect to the upturned portion of the center plate 26. The three coupling plates are apertured adjacent the outer ends thereof, adapted to removably and loosely receive a plurality of eye-bolts 31, shown in Figures 2 and 8. It will be noted by reference to Figure 2 that the coupling plates 25 and 26 are comparatively wide so that when they are coupled to the draft bar 17, as above described, a very substantial connection is provided between the tractor and draft bar.

By thus connecting the plow frame to the tractor, the front end of the tractor will also be permitted to move up and down as when passing over rough surfaces in the roadway, but lateral movement of the plow frame with respect to the tractor will substantially be prevented.

Referring to Figure 2, it will be noted that the plow frame, including the side beams 16, draft bar 17, and the bulk head 12, provide in effect, a rectangular frame adapted to receive the tractor, as shown in dotted lines in this figure. To connect the plow to the tractor, the draft bar 17 is detached from the side beams 16, after which the tractor may be moved in between the two side beams 16 to the position shown in broken lines in Figure 2. The draft bar 17 is then secured to the side beams 16 and the rear end of the tractor connected to the draft bar by means of the coupling plates 25 and 26 and the eye-bolts 31, as previously stated.

An important feature of this invention resides in the means provided for resiliently supporting upon the tractor, the plow 11 and the forward end of its supporting frame, whereby all or a portion of the weight of the plow may be carried upon the tractor to increase its tractive power. Means are also provided for supporting the plow independently of the tractor, whereby the entire weight of the plow and its supporting frame may be removed from the tractor, which has been found desirable, especially when bucking large snow drifts, in that it prevents the plow from lifting and sliding over the snow, which might happen if the weight of the plow were carried upon the tractor.

The means provided for resiliently supporting the forward end of the plow frame upon the tractor is shown in detail in Figures 4 and 5, and consists in the provision of upright supporting members 32 adapted to be secured to the frame members 33 of the tractor as shown in dotted lines in Figure 5. Each supporting member 32 has its inwardly extending webs slotted as indicated at 34, adapted to receive the outer horizontal webs of the side I-beams 33 of the tractor frame, as shown. Angle clips 35 provide means for securing the supporting members 32 to the tractor frame members 33.

A U-bolt 36 connects the upright portion of each supporting member 32 with the tractor frame 37 as shown in Figure 5. Thus, the upright supporting members 32 are rigidly and securely mounted upon the tractor frame. Each supporting member 32 has a bracket 38 secured to the upper end thereof, which extends outwardly therefrom, and has an aperture 39 therein adapted to slidably receive the lower end of a flanged sleeve 41 having, a compression spring 42 coiled thereabout, the lower end of which engages the bracket 38 and the upper end the flange 43 of the sleeve 41. Lifting rods 44 are pivotally connected at 50 with the I-beams 16 of the plow frame and upwardly extend therefrom through the sleeves 41 and have their upper end threaded to receive a pair of elongated adjusting elements or nuts 45, each having a handle or grip 46 whereby it may be conveniently rotated. The above described mechanism provides means for resiliently supporting the forward end of the plow frame upon the tractor as it will be noted that the adjusting nuts 45, received in threaded engagement with the upper end of the lifting rods 45, are seated against the upper ends of the flanged sleeves 41. The compression springs 42 are interposed between the flanges 43 and the brackets 38 and, as a result of the latter being fixed to the tractor frame, it will readily be seen that when the adjusting nuts 45 are rotated in a direction to receive the threaded end portions of the lifting rods 44, that the side beams 16 of the plow frame will be elevated with respect to the tractor and ground level and will be carried upon the compression springs 42, the sleeves 41 being free to vertically slide within the apertures 39, provided in the brackets 38.

Another feature of the invention resides in the means provided for raising and lowering the forward end of the plow frame with respect to the tractor. Such means resides in the provision at each side of the forward end of the plow frame, of a vertically movable support 47, which preferably is hollow and has a suitable roller or wheel 48, rotatably mounted in the lower portion thereof, the periphery of which extends slightly below the lower face or surface of a shoe 49, secured to the lower end of the support. (See Figures 1, 3, 4, and 5.) The support 47 is slidably mounted in guides 51 and 52 provided on each beam 16 of the plow frame. Suitable jacks 53, of ordinary construction, are terminally mounted upon the supports 47 and have their upper ends arranged to engage plates 54 of the bulk head. The plates 54 are suitably braced or reinforced by means of angle irons 55, as shown in Figures 1, 4, and 5. The jacks are operable by suitable means, not shown. When the supports 47 are positioned as shown in Figure 4, and the jacks are extended, the forward end of the plow frame and also the plow will be lifted clear of the ground so that the weight of the plow and frame is carried or supported entirely upon the supports 47 and the wheels 48 or shoes 49, engaging the ground. These supports, therefore, provide means for supporting the plow frame and plow independently of the tractor.

Means are provided for raising or lifting the supports 47 out of engagement with the ground, when it is desired to resiliently support the plow upon the tractor frame by means of the springs 42, as shown in Figure 5. Such means resides in the provision of suitable tackle blocks 56, supported upon masts 57 provided at each side of the plow frame adjacent the forward end thereof, and as shown in Figures 1, 3, and 4. The supports 47 are connected to the depending chains 58 and 59 of the block and tackle 56, as shown in Figures 4 and 5. In Figure 4, it will be noted that the supports 47 are in engagement with the ground or street surface, while in Figure 5, one of the supports is shown moved out of engagement with the ground and, in this figure, it will be noted that the support is suspended from the chains 58 and 59 which, it will be seen, are taut. It will also be seen by reference to Figure 5, that the upper end of the jack 53 is out of engagement with the plate 54 so that the entire weight of the plow and forward end of the plow frame is supported wholly upon the side means 33 of the tractor frame.

The jacks 53 and supports 47 also provide means for elevating the forward end of the plow frame to permit the adjusting elements or nuts 45, received in threaded engagement with the upper ends of the lifting rods 44, to be manually rotated. By means of the jacks 53 and supports 47, the plow frame may therefore be elevated sufficiently to relieve the compression springs 42 of their load, after which the nuts 45 may readily be rotated to adjust or vary the vertical position of the plow with respect to the ground level or tractor. If desired, the nuts 45 may be adjusted so that the springs 42 will only partially carry the weight of the plow frame and plow, thereby causing the plow to ride upon the rollers 14 and 48 and thus follow the contour of the ground or street surface. If desired, the nuts 45 may also be adjusted so that the entire weight of the plow and its supporting frame will be carried wholly upon the rollers 14 and 48 or the shoes 49. The above described mechanism therefore, provides means for vertically adjusting the position of the plow with respect to the tractor, and also whereby the weight of the plow may be carried either by the rollers 14 and 48, or by the tractor, so that the necessary weight required to hold the plow in close contact with the street surface, when plowing snow, may readily be obtained. The lower ends of the masts 57 are supported in suitable hangers 60, secured to the plow frame, and are further braced by means of upper frame structures 61 secured to the bulk head 12 and to the upper portions of the mold boards 11. (See Figures 3 and 4.)

Another feature of the invention resides in the provision of auxiliary wings 62, pivotally mounted back of the plow 11 and adapted to swing outwardly as shown in the upper portion of Figure 2, to increase the effective plowing width of the plow. These wings are pivotally and slidably mounted upon the lower portions of the masts 57, as shown in Figure 5, and are vertically movable by the block and tackle chains 59 which, it will be noted, are connected to the upper portions or ends of the wings 62, adjacent the masts 57. The outer ends of the wings are laterally braced or supported by means of telescopic thrust rods 63, having their ends pivotally connected respectively to the wing 62 and upright members 64, secured to the rear end portions of the side beams 16 of the plow frame. (See Figures 1 and 2.) Each thrust rod 63 is provided with a plurality of apertures 65 adapted to receive an eye-bolt 66 whereby the length of the rod may be varied to adjust the angle of the side wings 62 with respect to the plow frame. (See Figure 2.) By means of these side wings 62, a comparatively wide strip may be plowed at one time. Also, if desired, the side wings may be partially elevated, as shown at the left hand side of Figure 3, so as to more evenly distribute the snow conveyed to each side of the mold boards 11. The side wings may also be folded against the plow frame as shown in the lower portion of Figure 2, in which position, it will be noted that they will not project beyond the ends of the mold boards. Each wing 62 preferably has a runner 68 secured to the bottom thereof adapted to engage the ground, to prevent the cutting edge 69 thereof from digging into the ground when the wings are positioned close to the ground surface. A tie rod 67 connects together the upper ends of the upright members 64.

The novel snow plow featured in this invention is particularly well adapted for use in rural districts to clear trunk highways or other thoroughfares of snow. The resilient mounting of the plow frame upon the tractor, in connection with the jacks 53 and supports 47, provides means whereby the plow may readily be lifted off the ground to clear railroad tracks or other obstacles in the road surface. The above mechanism also provides means for varying the weight carried by the rollers or wheels 14 and 48. This is an important feature, as it has been found in actual practice, that when bucking heavy snow drifts, it is sometimes desirable to add weight to the tractor in order to prevent the traction belts or wheels thereof from slipping. The resilient mounting in connection with the supports 47 and the jacks 53 provide means whereby a portion of the weight of the plow or the entire weight thereof may thus be transferred onto the tractor to be carried thereby, thus preventing such slipping of the tractor traction belts on the road or street surface. The adjusting elements or nuts 45 may also be adjusted so as to relieve the tractor of the weight of the plow. This has also been found of advantage, especially when bucking or plow snow that is comparatively hard, as by carrying the weight of the plow upon the rollers 14 and 48, the plow will be prevented from raising or sliding over the snow.

I claim as my invention:

1. An apparatus of the class described, comprising a frame having means for connecting it with a tractor, a plow attached to the frame, supporting members secured to the tractor frame, lifting members pivotally connected to the plow frame and having adjusting elements mounted on the upper ends thereof and yieldable means connecting said supporting members with said lifting members to provide resilient supports for the forward end of the plow frame.

2. An apparatus of the class described, comprising a frame having means for connecting it with a tractor, a plow attached to the forward end of the frame, supporting members secured to the tractor frame, lifting members pivotally connected to the plow frame and having yieldable connections with said supporting members and adapted to resiliently support the forward end of the plow frame upon the tractor and adjusting elements received in threaded engagement with said lifting members to provide adjustment for the forward end of the plow frame.

3. An apparatus of the class described, comprising a frame having means for connecting it with a tractor, a plow attached to the forward end of the frame, supporting brackets secured to the tractor, lifting rods pivotally connected with the plow frame and upwardly extending therefrom, adjusting elements mounted on the upper ends of said rods, and spring elements interposed between said adjusting elements and said brackets adapted to resiliently support the forward end of the plow frame upon the tractor.

4. An apparatus of the class described, comprising a frame having means for connecting it with a tractor, a plow attached to the forward end of the frame, upright supporting members secured to the tractor, outwardly extending brackets secured to said members and having guide apertures therein, lifting rods pivotally connected with the plow frame and upwardly extending therefrom and traversing said apertures, adjusting elements mounted on the upper ends of said rods, and spring elements interposed between said adjusting elements and said brackets adapted to resiliently support the forward end of the plow frame upon the tractor.

5. An apparatus of the class described, comprising a frame having a plow secured to the forward end thereof, means at the rear end of the frame for connecting it to a tractor, means on the tractor adapted to resiliently support the forward end of the frame on the tractor, supporting members vertically slidable in said frame, and means for operating said supporting members to elevate the plow with respect to the tractor whereby the resilient mountings may be adjusted to carry a portion or all of the weight of the plow, when said supporting members are returned to inoperative positions.

6. An apparatus of the class described comprising a frame having a plow secured to the forward end thereof, means at the rear end of the frame for connecting it to a tractor, means for resiliently supporting the forward end of the frame upon the tractor, supporting members vertically slidable in said frame, means for operating said supporting members to elevate the plow with respect to the tractor whereby the resilient mountings may be adjusted to carry a portion or all of the weight of the plow upon the tractor, and flexible means for holding said supporting members out of engagement with the ground.

7. An apparatus of the class described, comprising a frame having a plow secured to one end thereof, means at the opposite end of the frame for connecting it to a tractor, a supporting bracket secured to each side of the tractor and each provided with an outwardly extending portion having an aperture therein, lifting members each having one end pivotally connected to the plow frame and having their upper ends traversing the apertures in said brackets, tension means seated upon said brackets and encircling the upper portions of said lifting members, and means adjustably secured to the upper ends of the lifting members for adjusting said tension means, whereby all or a portion of the weight of the plow and its supporting frame may be carried upon the tractor.

8. An apparatus of the class described, comprising a frame having a plow secured to the forward end thereof, means at the rear end of the frame for connecting it to a tractor, a supporting bracket secured to each side of the tractor, and each provided with an outwardly extending portion having a guide aperture therein, lifting members pivotally connected to each side of the plow frame and having their upper ends traversing the apertures in said brackets, tension means seated upon said brackets and encircling the upper portions of said lifting members, means adjustably secured to the upper ends of said lifting members for adjusting said tension means whereby all or a portion of the weight of the plow and its supporting frame may be resiliently carried upon the tractor, and a support adapted for vertical adjustment in said plow frame, whereby it may be moved into engagement with the ground to elevate the plow frame and to permit convenient adjustment of said tension-adjusting means.

9. An apparatus of the class described, comprising a plow frame having means for connecting it with a tractor, a plow attached to the forward end of said frame, auxiliary wings pivotally connected with said frame and adapted to be swung outwardly to increase the swath of the plow, rods movably mounted in supports provided on the sides of the tractor and each having one end connected with the plow frame, means adjustably mounted upon the opposite end of each rod, and resilient elements interposed between said supports and said adjustably mounted means, said rods, means and resilient elements cooperating to yieldably support the plow frame on the tractor and providing means for vertically adjusting the plow frame with respect to the ground, and the yieldable connections between the plow frame and tractor being adapted to carry all or a part of the weight of said plow frame.

In witness whereof, I here hereunto set my hand this 15th day of April, 1927.

ANTON CHARLES HEINZEN.